June 18, 1968
B. O'BYRNE
3,388,443
MOUNTING OF NEEDLES IN THE NEEDLE BOARDS OF WEB PUNCHING OR NEEDLING MACHINES
Filed Dec. 27, 1965
3 Sheets-Sheet 1
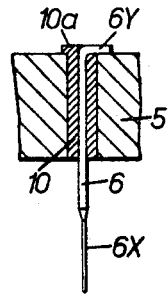
-FIG.1A-
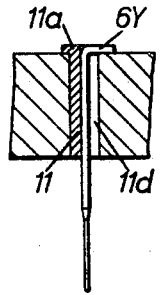
-FIG.1B-
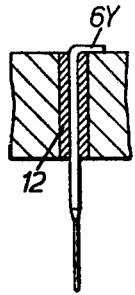
-FIG.1C-
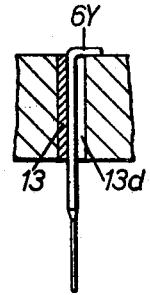
-FIG.1D-
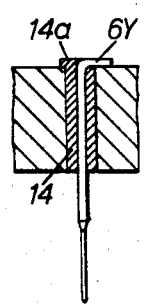
-FIG.1E-
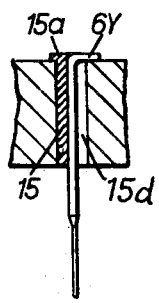
-FIG.1F-
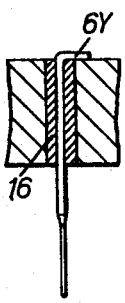
-FIG.1G-
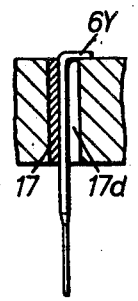
-FIG.1H-
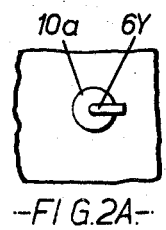
-FIG.2A-
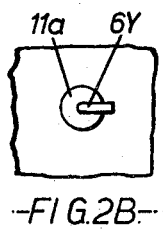
-FIG.2B-
-FIG.2C-
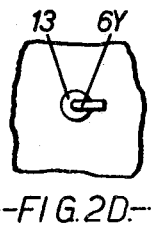
-FIG.2D-
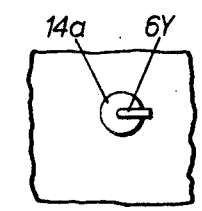
-FIG.2E-
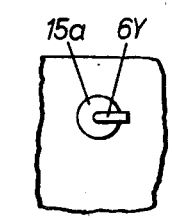
-FIG.2F-
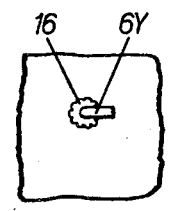
-FIG.2G-
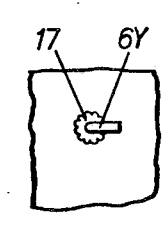
-FIG.2H-
INVENTOR:
BRENDAN O'BYRNE
BY
Abraham A. Saffitz
ATTORNEY

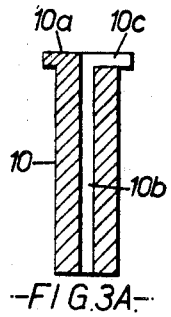
-FIG.3A-
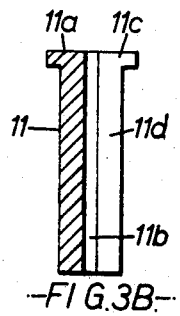
-FIG.3B-
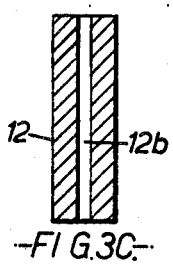
-FIG.3C-
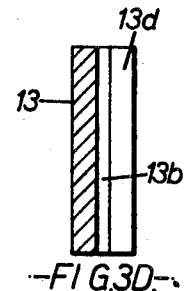
-FIG.3D-
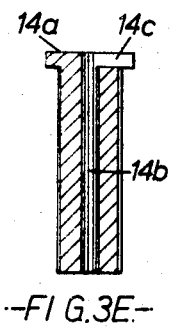
-FIG.3E-
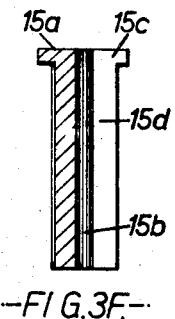
-FIG.3F-
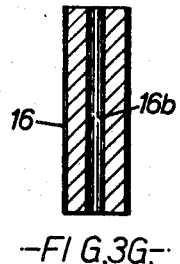
-FIG.3G-
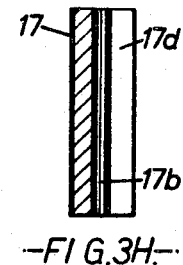
-FIG.3H-
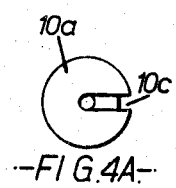
-FIG.4A-
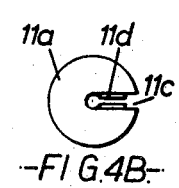
-FIG.4B-
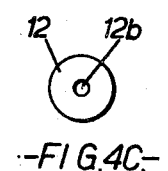
-FIG.4C-
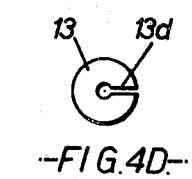
-FIG.4D-
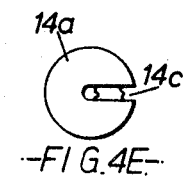
-FIG.4E-
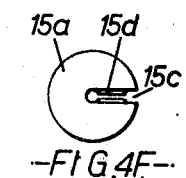
-FIG.4F-
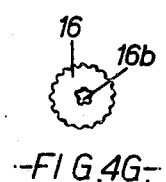
-FIG.4G-
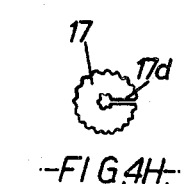
-FIG.4H-
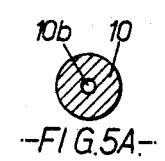
-FIG.5A-
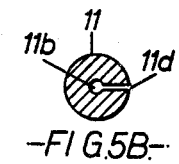
-FIG.5B-
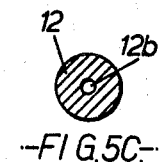
-FIG.5C-
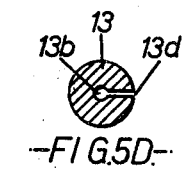
-FIG.5D-
INVENTOR:
BRENDAN O'BYRNE
BY
Abraham A. Saffitz
ATTORNEY June 18, 1968  B. O'BYRNE  3,388,443
MOUNTING OF NEEDLES IN THE NEEDLE BOARDS OF WEB
PUNCHING OR NEEDLING MACHINES
Filed Dec. 27, 1965  3 Sheets-Sheet 3
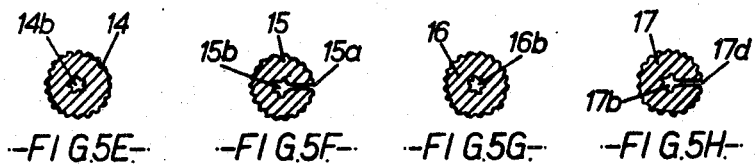
—FIG.5E—   —FIG.5F—   —FIG.5G—   —FIG.5H—
—FIG.6—
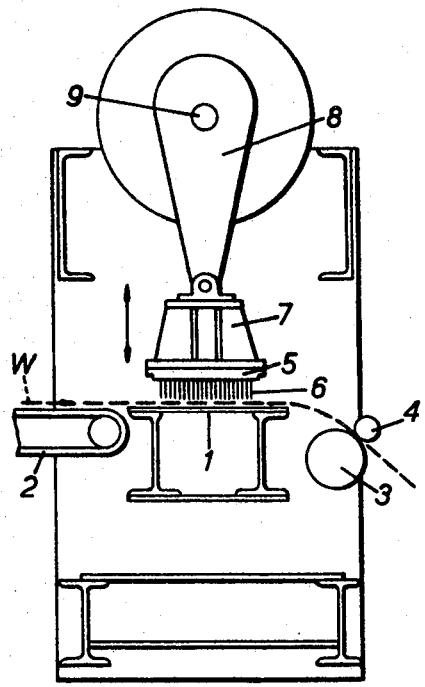
INVENTOR:
BRENDAN O'BYRNE
BY
Abraham A. Saffitz
ATTORNEY

United States Patent Office 3,388,443
Patented June 18, 1968

3,388,443
MOUNTING OF NEEDLES IN THE NEEDLE
BOARDS OF WEB PUNCHING OR NEE-
DLING MACHINES
Brendan O'Byrne, Batley, York, England, assignor to
William Bywater Limited, Leeds, England
Filed Dec. 27, 1965, Ser. No. 516,580
Claims priority, application Great Britain, Aug. 11, 1965,
34,277/65
5 Claims. (Cl. 28—4)

ABSTRACT OF THE DISCLOSURE

A needle assembly in a needle board of a web punching machine and method of making consisting of making the part of the needle board in which the needles are mounted to form an unyielding, wear-resistant part providing holes for the needles in said part, which holes are of larger cross section than the needle shanks, fitting compressible, semi-rigid plastic liners or bushes into the holes and inserting and force fitting the needles through the liners of the holes so that the needle shanks are forced against the bushes in a tight fit to compress the material of the bushes against the inner rigid walls of the holes.

---

This invention relates to the mounting of needles in the needle boards of web punching or needling machines which are used for treating webs of fibrous material so as to intermingle the fibres.

It is the usual practice to make these needle boards from wood and to drill in such a board a multiplicity of small holes in a chosen pattern, into which holes the needle shanks are forced. Due to the fibrous structure and natural properties of wood which is non-rigid, it is difficult to ensure that these holes will be accurate in size and pattern and they are liable to wear or yield so that the needles may work loose or become mis-aligned, with the result that the needles may not register accurately with the holes or slots in the needle bed and stripper plate. The same difficulty can arise due to contraction, expansion or other movement of the structure of the wood caused by variations in the surrounding atmospheric conditions.

The use of metal for the needle boards has been proposed but the needle shanks which are to be mounted into the metal needle board which is an unyielding and wear-resistant material must be into the board which is provided with drilled holes, and this preliminary drilling operation requires the holes to be drilled to accurate limits for the proper alignment of the needles. An example of such metal mounting is found in Foster, U.S. Patent No. 2,391,-560, granted in December 1945. Even then a good fit cannot be ensured in all cases due to slight variations in the diameters of the needle shanks which are force fitted into the holes of the unyielding, wear-resistant, metal material.

With a view to overcoming these difficulties and to attaining certain other advantages which will hereinafter be explained, it is proposed according to the present invention to make the needle board, or at least the part thereof in which the needles are to be mounted, from a light-weight metal or metal alloy, or other rigid material in which the holes for the needles are formed or produced, and to mount the needles therein by means of bushes or liners of compressible, semi-rigid material and into which the needle shanks are pressed.

By this procedure the holes drilled in the board need not be very accurate as to diameter because the interposition, between the wall of a hole and the shank of a needle, of the bush or liner ensures a tight fit for the needle.

The bushes or liners may have their outer walls cylindrical or they may be slightly tapered to ensure a better grip in the holes, and their bores may be drilled or, in the case of plastics being used, may be formed by the moulding process. Alternatively, the bushes or liners may be of fluted section, it being found that such a profile gives more latitude of tolerance on the hole size and the needle wire diameter. Also the bush or liner may have a flange at one end to locate it longitudinally in its hole and this flange may have a recess or slot to receive the cranked end of the needle shank. This serves to indicate the angular position of the needle which it is important to know, for example with needles of triangular cross-section having three sets of barbs facing in different directions.

In order that the invention may be fully and clearly comprehended, the same will now be described with reference to the accompanying drawings, wherein:

FIGURES 1A to 1H are fragmentary vertical sections through a needle board showing eight different methods of mounting a needle therein;

FIGURES 2A to 2H are plan views of the needle mountings shown in FIGURES 1A to 1H respectively;

FIGURES 3A to 3H are vertical sections, taken through their longitudinal axes, of the bushes alone as shown respectively in FIGURES 1A to 1H;

FIGURES 4A to 4H are plan views of the bushes alone as shown respectively in FIGURES 2A to 2H;

FIGURES 5A to 5H are transverse sections through the bushes alone;

FIGURE 6 indicates the location and manner of operation of the needle board of a web punching machine to which the invention relates.

Referring first to FIGURE 6 of the accompanying drawings, there is shown a needle bed 1 across which the web W is drawn from a feed conveyor 2 intermittently by draw rollers 3, 4. The needle board 5 in which are mounted the needles 6 is carried by a needle arm 7 arranged to be reciprocated vertically by crank arms such as 8 operated by an eccentric shaft 9 suitably driven. The needles are closely spaced throughout the needle board in any desired pattern. It is to be understood that the method of mounting the needles in the board according to this invention may be applied equally well to boards arranged to perform upward needling instead of downward needling as illustrated or working in the horizontal or other plane.

In FIGURES 1A, 2A, 3A, 4A and 5A the needles 6 are in all cases shown as having a cylindrical shank with a reduced lower part 6X of triangular or other cross-section carrying barbs and a cranked head 6Y, and the needle board 5 is made from a rigid material having cylindrical holes for the needles.

In the embodiment of the invention illustrated in FIGURES 1A, 2A, 3A, 4A and 5A, each needle hole in the board has fitted into it a bush 10 of compressible material and of a length approximately equal to the depth of the board. This bush has a circular flange 10a which engages the surface of the board to locate the bush longitudinally in its hole and a central cylindrical bore 10b of a diameter slightly less than that of the needle shank. When the needle is pressed through the bush until its head 6Y abuts the surface of the board, this head engages in a radial slot 10c in the bush flange and is thereby located angularly in the hole.

The interference fit of the needle shank in the bush compresses the material of the latter with an outwardly expanding tendency sufficient to secure the bush in the hole in the board and to hold the assembly firm with an accurate axial alignment.

In the modification shown in FIGURES 1B, 2B, 3B, 4B and 5B, the bush 11 is similar to bush 10, having flange 11a with slot 11c, but its body is also slotted throughout its length radially at 11d from the bore 11b so that insertion of the needle shank can more easily expand the bush as well as compress its material.

In the modification shown in FIGURES 1C, 2C, 3C, 4C and 5C, the bush 12 is similar to bush 10 so far as its body and bore 12b is concerned, but it has no flange. This simpler construction without the locating flange and slot will still be effective in securing the needle in the board and may be an advantage in facilitating the removal of the needles as will be referred to hereinafter.

The bush 13 shown in FIGURES 1D, 2D, 3D, 4D and 5D is the same as bush 12 except that it is slotted throughout its length radially from its bore 13b (i.e., split longitudinally) at 13d to facilitate expansion of the bush. If the bush projects slightly above the surface of the board this slot will also help to locate the needle angularly by engaging the cranked head 6Y.

The bush 14 shown in FIGURES 1E, 2E, 3E, 4E and 5E is the same as bush 10, having a flange 14a with slot 14c and a bore 14b, but the wall of the bore and the outer surface of the body are furnished with narrow longitudinal deformable flutes as clearly shown in FIGURE 5E to give more latitude of tolerance as hereinbefore suggested.

The bush 15 shown in FIGURES 1F, 2F, 3F, 4F and 5F is the same as bush 11, having a flange 15a, bore 15b, and slots 15c, 15d, but it has fluted inner and outer walls similar to bush 14.

Bush 16 shown in FIGURES 1G, 2G, 3G, 4G and 5G is a simple cylinder like bush 12 with a bore 16b, but has the fluted walls similar to bush 14.

Likewise bush 17 shown in FIGURES 1H, 2H, 3H, 4H and 5H is similar to bush 13 with a bore 17b and slot 17d, but this again has fluted walls.

If desired, the bushes or liners may be split longitudinally into two or more parts to facilitate the securing of the needles in the holes.

Moreover, the bushes or liners may be of various colours and inserted in the board in a pre-arranged pattern or order to accept different types of needles and to indicate thereafter the positions of these different types.

A further advantage of using differently coloured bushes is to facilitate the selection of which needles to remove and replace by new ones according to a predetermined sequence.

The use of bushes or liners enables the needles to be extracted in simple manner by passing a hollow punch, smaller in diameter than that of the holes in the board, over the needle to engage the bush and knock the bush and needle out. The bushes may be re-used, or discarded at will.

Whilst the hereinbefore described embodiments of the invention have been mentioned merely by way of example, it is to be understood that other suitable embodiments may be evolved for carrying out the invention and that protection is hereby claimed for all such embodiments within the scope of the appended claims.

I claim:

1. An assembly of needles in a needle board of a web punching machine, comprising in combination a needle board having at least the part thereof in which the needles are to be mounted made from a rigid material and having a series of needle holes therein each of a larger cross-sectional area than that of the needle shanks to be mounted therein, a bush of compressible, semi-rigid material pressed into each hole to line it, and a needle inserted through each bush so that the needle shank is a tight fit therein and so that the material of the bush is compressed against the inner wall of the hole.

2. In an assembly of needles in a needle board of a web punching machine, the combination called for in claim 1 wherein said needle holes are cylindrical and said bushes have their outer walls cylindrical.

3. In an assembly of needles in a needle board of a web punching machine, the combination called for in claim 1 including a cranked portion at the shank end of each of said needles and a flanged end on each of said bushes, each of said flanges being slotted to receive said cranked end of a needle, whereby each bush is located longitudinally in its hole and the angular position of each needle in the board is determined and indicated.

4. In an assembly of needles in a needle board of a web punching machine, the combination called for in claim 1 wherein each of said bushes is slotted throughout its length radially from its bore to its outer wall.

5. In an assembly of needles in a needle board of a web punching machine, the combination called for in claim 1 wherein at least one wall of each of said bushes is longitudinally fluted whereby said flutes can be deformed when said bush is pressed into its hole.

References Cited

UNITED STATES PATENTS

| 2,326,038 | 8/1943 | Kopwin et al. | 28—4 |
| 2,391,560 | 12/1945 | Foster | 28—4 |
| 3,122,815 | 3/1964 | Smith | 28—4 |

LOUIS K. RIMRODT, *Primary Examiner.*